No. 885,483.

PATENTED APR. 21, 1908.

J. W. JONES.
INSECT EXTERMINATOR.
APPLICATION FILED APR. 20, 1907.

Witnesses
W. N. Woodson
Edmund McEwan

Inventor
John W. Jones

By R. A. Lacey,
Attorneys

UNITED STATES PATENT OFFICE.

JOHN W. JONES, OF ROOSEVELT, OKLAHOMA.

INSECT-EXTERMINATOR.

No. 885,483.  Specification of Letters Patent.  Patented April 21, 1908.

Application filed April 20, 1907. Serial No. 369,319.

*To all whom it may concern:*

Be it known that I, JOHN W. JONES, a citizen of the United States, residing at Roosevelt, in the county of Kiowa and State of Oklahoma, have invented certain new and useful Improvements in Insect-Exterminators, of which the following is a specification.

The present invention relates to insect-exterminators and more particularly to a novel device for catching that type of insects such as the horn fly which infect cattle and other live stock.

The object of the invention is to provide an insect exterminator which is simple and comparatively inexpensive in its construction and which operates by means of a forced air draft to collect the insects and carry them into a cage where they can be readily destroyed.

Figure 1:
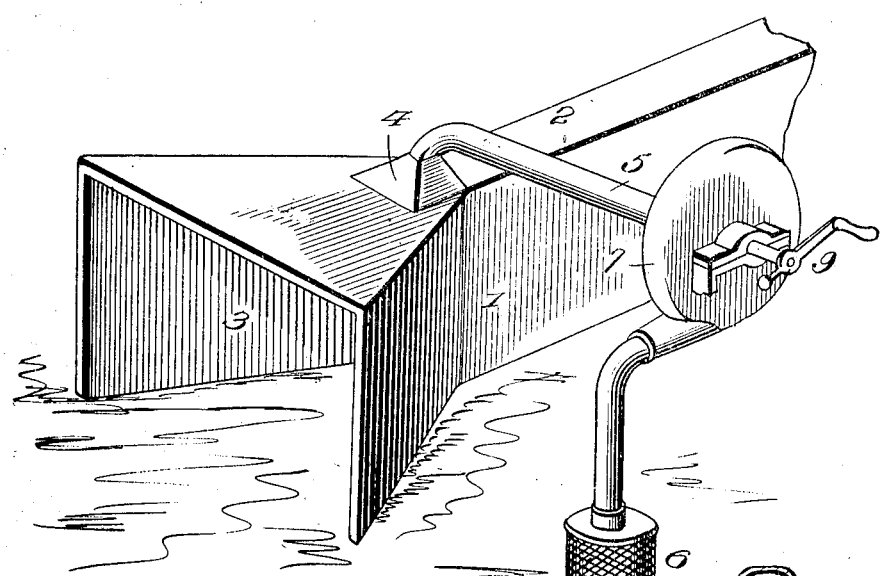
Figure 2:
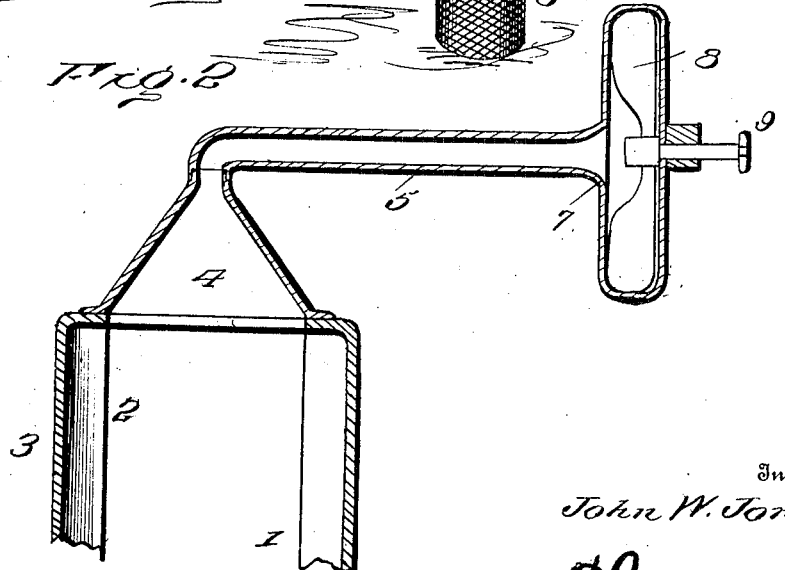

For a full description of the invention and the merits thereof and also to acquire a knowledge of the details of construction and the means for effecting the result, reference is to be had to the following description and accompanying drawings, in which:

Figure 1 is a perspective view of the invention. Fig. 2 is a transverse sectional view through the same.

Corresponding and like parts are referred to in the following description and indicated in all the views of the drawings by the same reference characters.

Broadly speaking the invention comprises essentially a run way through which the animal is driven and a trap for withdrawing the insects from the run way, the said trap comprising a hood located over the run way for collecting the flies and a tube leading from the upper end of the hood and terminating in a cage, means being provided for producing a forced draft within the tube for causing the insects to pass through the same and enter the cage. The run way through which the animals are driven is indicated at 1 and comprises a contracted portion 2 and a flared mouth or entrance 3. Located over the run way at the junction of the flared portion 3 and contracted portion 2 is a hood 4 the sides of which gradually converge upwardly, the top of the hood being in communication with a tube 5. At the extremity of the tube 5 there is located a cage 6 designed to receive the flies or insects and hold the same previous to their destruction. A casing 7 is located at an intermediate point in the length of the tube 5 and within the casing is mounted a fan 8 for producing a forced draft within the tube which operates through suction to draw the flies within the tube and deliver them into the cage. Any suitable means may be employed for operating the fan, and in the present instance the fan shaft is shown as extended beyond one side of the casing and provided with a crank 9.

When the animal approaches the contracted portion 2 of the run way the insects which may be resting upon it are frightened off and rise within the hood 4, and as they approach the upper portion of the hood they are caught in the forced draft and withdrawn into the tube 5. The flies or other insects which are collected within the cage can be disposed of or destroyed in any desired manner. It will be understood that the upper portion of the hood 4 may be formed of glass, white cloth, celluloid or any transparent or translucent material and that the suction tube may be of wood, rubber, metal, or any other desirable material.

Having thus described the invention, what is claimed as new is:

1. In a device of the character described, the combination of a run way formed with a contracted portion and a flared mouth, and a trap operating to withdraw the insects from the run way at the junction of the flared mouth and the contracted portion thereof.

2. In a device of the character described, the combination of a run way formed with a contracted portion and a flared mouth, a hood located over the run way at the junction of the flared mouth and contracted portion thereof, a tube leading from the hood, and means for producing a draft within the tube.

3. In a device of the character described, the combination of a run way formed with a contracted portion and a flared mouth, a hood located over the run way at the junction of the flared mouth and contracted portion thereof, a tube leading from the hood, a cage at the discharge end of the tube, a casing at an intermediate point of the tube, and a fan operating within the casing for producing a forced draft through the tube.

In testimony whereof I affix my signature in presence of two witnesses.

JOHN W. JONES. [L. s.]

Witnesses:
 WILLIAM MEYER,
 THOMAS E. RITCHARDS.